US010680437B2

(12) United States Patent
Lebel et al.

(10) Patent No.: US 10,680,437 B2
(45) Date of Patent: Jun. 9, 2020

(54) METHOD OF STABILIZING AN ELECTRICAL NETWORK BY LOAD SHEDDING

(71) Applicant: INSTITUT POLYTECHNIQUE DE GRENOBLE, Grenoble (FR)

(72) Inventors: Gaspard Lebel, Lans en Vercors (FR); Nouredine Hadjsaid, Grenoble (FR); Raphaël Caire, Grenoble (FR)

(73) Assignee: INSTITUT POLYTECHNIQUE DE GRENOBLE, Grenoble (FR)

( * ) Notice: Subject to any disclaimer, the term of this patent is extended or adjusted under 35 U.S.C. 154(b) by 950 days.

(21) Appl. No.: 15/103,622

(22) PCT Filed: Dec. 15, 2014

(86) PCT No.: PCT/EP2014/077815
§ 371 (c)(1),
(2) Date: Jun. 10, 2016

(87) PCT Pub. No.: WO2015/091387
PCT Pub. Date: Jun. 25, 2015

(65) Prior Publication Data
US 2016/0315473 A1    Oct. 27, 2016

(30) Foreign Application Priority Data
Dec. 16, 2013   (FR) ..................... 13 62664

(51) Int. Cl.
*H02J 3/14* (2006.01)
*H02J 13/00* (2006.01)
*H02J 3/38* (2006.01)

(52) U.S. Cl.
CPC ............... *H02J 3/14* (2013.01); *H02J 3/381* (2013.01); *H02J 3/382* (2013.01);
(Continued)

(58) Field of Classification Search
CPC .... H02J 3/14; H02J 3/381; H02J 3/383; H02J 13/0006
(Continued)

(56) References Cited

U.S. PATENT DOCUMENTS 4,216,384 A * 8/1980 Hurley ............... H02J 3/14
307/35
6,314,378 B1   11/2001 Hodge et al.
(Continued)

FOREIGN PATENT DOCUMENTS

CN    105900308 B    3/2019
EP      3084910 B1    5/2018
(Continued)

OTHER PUBLICATIONS

NPL document: "A General-Order System Frequency Response Model Incorporating Load Shedding: Analytic Modeling and Applications", IEEE Transactions on Power Systems, vol. 21, No. 2, May 31, 2006 (May 31, 2006), pp. 709-717 (Year: 2006).*
(Continued)

*Primary Examiner* — Alfonso Perez Borroto
(74) *Attorney, Agent, or Firm* — Kaplan Breyer Schwarz, LLP (57) ABSTRACT

The invention relates to a method of stabilization between a high frequency and a low frequency, of an electrical network supplying several sub-networks (22), each sub-network comprising a sub-network manager (24) and supplying N consumer sites (28), each site, j, comprising sheddable loads (34), the method comprising for each sub-network the following steps: ensuring a communication between each site and the sub-network manager thereof; periodically measuring the value of the sheddable power in consumed at each site; deducing for each site an estimated sheddable power; and dispatching to each site j (28) a threshold frequency, such that sheddable loads (34) of this site are unplugged when the frequency of the network drops below the threshold frequency, in which the sub-network manager (24) calculates the threshold frequencies in such a way that the variation of the sheddable powers as a function of frequency is substantially linear.

9 Claims, 4 Drawing Sheets

(52) U.S. Cl.
CPC ...... *H02J 13/0006* (2013.01); *H02J 13/0093* (2013.01); *H02J 3/383* (2013.01); *H02J 3/386* (2013.01); *Y02B 70/3225* (2013.01); *Y02E 10/563* (2013.01); *Y02E 10/763* (2013.01); *Y02E 40/72* (2013.01); *Y04S 10/123* (2013.01); *Y04S 20/222* (2013.01)

(58) Field of Classification Search
USPC .......................................................... 307/29
See application file for complete search history.

(56) References Cited

U.S. PATENT DOCUMENTS

| | | | | |
|---|---|---|---|---|
| 2004/0254688 | A1* | 12/2004 | Chassin | H02J 3/14 700/295 |
| 2009/0299540 | A1* | 12/2009 | Abi-Samra | H02J 3/14 700/295 |
| 2012/0053744 | A1* | 3/2012 | Manson | H02J 3/14 700/293 |

FOREIGN PATENT DOCUMENTS

| | | |
|---|---|---|
| GB | 2361118 A | 10/2001 |
| GB | 2426878 A | 6/2006 |
| WO | 9737415 A1 | 9/1997 |

OTHER PUBLICATIONS

D.L.H. Aik, "A General-Order System Frequency Response Model Incorporating Load Shedding: Analytic Modeling and Applications", ISSN: 0885-8950, DOI: 10.1109/TPWRS.2006.873123, "IEEE Transactions on Power Systems", May 31, 2006, pp. 709717, vol. 21, No. 2, Publisher: IEEE.

Authorized Officer: Julien Chabas, "International Search Report" issued in counterpart International PCT Patent Application No. PCT/EP2014/077815, dated Feb. 20, 2015.

English Translation of the "Written Opinion of the International Searching Authority" for counterpart International Patent Application No. PCT/EP2014/077815, dated Mar. 5, 2016, Publisher: PCT.

Decision on the Grant of a European Patent issued in counterpart EP patent application No. 14814829.9, dated Apr. 12, 2018, 3 pp.

Notification to Grant Patent Right for Invention issued in counterpart CN patent application No. 201480068867.9, dated Dec. 14, 2018, 1 pp.

* cited by examiner

METHOD OF STABILIZING AN ELECTRICAL NETWORK BY LOAD SHEDDING

The present patent application claims the priority benefit of French patent application FR13/62664 which is herein incorporated by reference.

BACKGROUND

The present application relates to a method of stabilizing an electrical network by load shedding.

DISCUSSION OF THE RELATED ART

To supply electric power consumer sites, centralized electric power generators inject electric power on a high-voltage network, that is, a network having voltages over 50 kV (HVB). First transformers transfer this high voltage onto public medium-voltage sub-networks, that is, networks having voltages in the range from 20 to 50 kV. The users are connected either to public low-voltage sub-networks—this applies, in particular, for domestic installations—or to private medium-voltage sub-networks—this applies in particular the case for industrial users. The electric power consumption sites connected to a private medium-voltage sub-network or to a public low-voltage sub-network will here be called consumer sites.

When the power absorbed by the consumer sites increases without for the generators to increase the power injected onto the network, the difference between the consumed power and the injected power results in a lowering of the frequency of the network with respect to a nominal operating frequency (for example, 50 or 60 Hz).

To rapidly respond to a consumed power increase, the producers keep an available (but expensive) power reserve. Thus, when a frequency decrease is observed on the network, the reserve is injected onto the network to check the frequency deviation and then reduce to zero the difference between the consumed power and the generated power. In practice, the difference between the generated power and the consumed power is desired to cause no significant variation of the frequency relative to the nominal operating frequency (0.4% on interconnected continental networks).

When the reserve of available injectable power is not sufficient to satisfy an increase in the consumed power or when this reserve is not injected sufficiently fast onto the network, additional means for decreasing the difference between the generated power and the consumed power comprise shedding some of the network loads. Sheddings are carried out from the moment that the network operating frequency falls below a certain threshold frequency. The sheddings are performed abruptly at the sub-network level.

Figure 1:
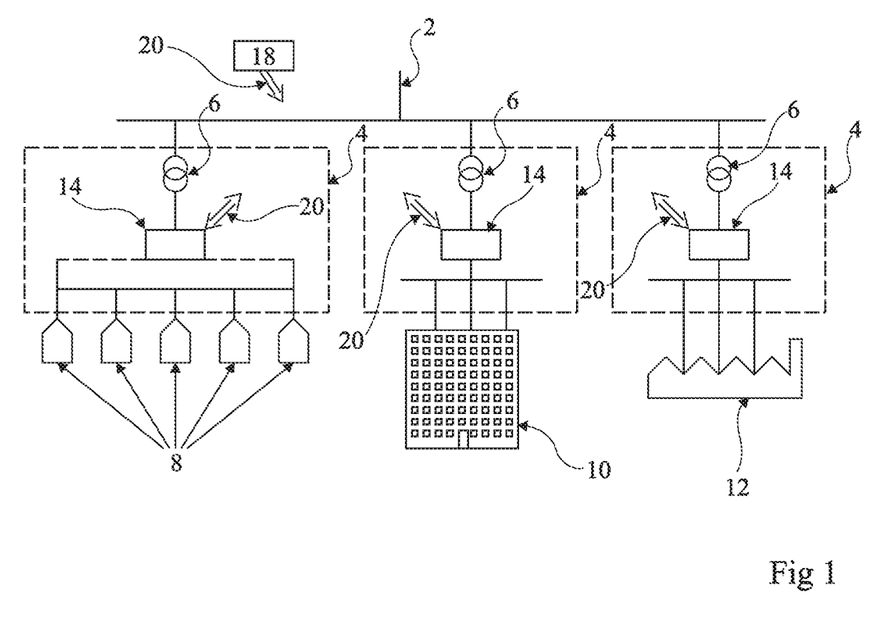
FIG. 1, previously described, corresponds to FIG. 1 of U.S. Pat. No. 6,314,378 showing an electrical network where load sheddings are performed, FIG. 2 schematically shows an example of an electric network adapted to a linear stabilization by load shedding.

FIG. 1 appended hereto corresponds to FIG. 1 of U.S. Pat. No. 6,314,378 and shows an electrical network where load sheddings are performed.

In this drawing, an electric distribution network 2 powers user sub-networks via sub-stations 4. Each sub-station 4 comprises a transformer 6 adapting the voltage of network 2 into voltages capable of powering sub-networks having consumer sites such as houses 8, apartment blocks 10, and factories 12 connected thereto. Each sub-station 4 further comprises a relay 14. A network manager 18 arranged at the network level calculates shedding conditions and programs them in relays 14 via communication means 20.

Each relay 14 verifies whether the shedding conditions calculated by network manager 18 are fulfilled or not. If the state of the network reaches the shedding conditions of a relay, the relay systematically controls the shedding of the sheddable loads of the users connected to the corresponding sub-network.

It can be observed that the power thus cut back varies erratically and may cause instabilities on the network.

US patent application No. 2009/0299540 relates to a load shedding system and to a method of stabilizing an electrical network by load shedding.

Article "A General-Order System Frequency Response Model Incorporating Load Shedding: Analytic Modeling and Applications" of D.L.H. AIK, published on May 31, 2006 in IEEE Transactions On Power Systems, volume 21, number 2, relates to a modeling of the frequency response of an isolated electrical network comprising a load shedding system.

SUMMARY

There thus is a need for a method of stabilizing an electrical network by load shedding so that the consumed power variation on the network as a result of a load shedding exhibits a dynamic response most adequate for an efficient stabilization of the electrical network, that is, which exhibits as little jolts as possible.

Thus, an embodiment provides a method of stabilizing, between a high frequency, fa, and a low frequency, fb, an electrical network powering a plurality of sub-networks, each sub-network comprising a sub-network manager and powering a plurality, N, of consumer sites, each site, j, comprising sheddable loads, the method comprising for each sub-network, the steps of: ensuring a communication between each site and its sub-network manager; periodically measuring at the level of each site the value of the instantaneous consumed power capable of being cut back; deducing for each site an estimated power capable of being cut back, $P_j$, for an upcoming period; setting an order 1 to N of disconnection of the sheddable loads; and sending to each site j a threshold frequency, $fs_j$, such that sheddable loads of this site are disconnected when the network frequency falls under threshold frequency $fs_j$, wherein the sub-network manager calculate the threshold frequencies so that the cutback power variation according to frequency is substantially linear.

According to an embodiment, the method further comprises the steps of: calculating and associating with each site, j, a frequency interval $[F_{min(j)}, F_{max(j)}]$, by applying the following formulas:

$$F_{max(j)} = fa + (fb - fa) \times \left( \sum_{i=1}^{j-1} P_i \Big/ \sum_{i=1}^{N} P_i \right)$$

$$F_{min(j)} = fa + (fb - fa) \times \left( \sum_{i=1}^{j} P_i \Big/ \sum_{i=1}^{N} P_i \right)$$

where $P_i$ is the estimated power capable of being cut back of the site of index i; and selecting the threshold frequencies within interval $[F_{min(j)}, F_{max(j)}]$.

According to an embodiment, the threshold frequency $fs_j$ of each site j (28) is selected in the middle of interval $[F_{min(j)}, F_{max(j)}]$.

According to an embodiment, the order 1 to N of disconnection of the sheddable loads is periodically modified.

According to an aspect, a system of stabilization of an electrical network powering a plurality of sub-networks is provided, each sub-network powering a plurality, N, of consumer sites, each site, j, comprising sheddable loads, the system comprising: at the level of each site, at least one meter for periodically measuring the value of the instantaneous power capable of being cut back, and a switch for disconnecting the sheddable loads when the network frequency falls below a threshold frequency, $fs_j$; a sub-network manager associated with each sub-network comprising means for calculating threshold frequencies so that the cutback power variation according to frequency is substantially linear; means of communication between each sub-network manager and the associated sites; and at the level of each site or at the level of the manager, means for determining over a period an estimated power capable of being cut back, $P_j$, the threshold frequencies being calculated based on the estimated powers capable of being cut back.

BRIEF DESCRIPTION OF THE DRAWINGS

The foregoing and other features and advantages will be discussed in detail in the following non-limiting description of specific embodiments in connection with the accompanying drawings, among which.

DETAILED DESCRIPTION

It is here provided to calculate the conditions of disconnection of sheddable loads by previously knowing the power effectively consumed by these loads and thus the power variation that each load shedding would cause. It is also provided to calculate the optimal shedding conditions at the sub-network level. It is ascertained that, in each sub-network, the variation of the cutback power according to the frequency variation of the network is as linear as possible. By superposing the variations of each sub-network, as linear a cutback power variation as possible is obtained at the network level. Thus, the sheddings are performed progressively, in the same way as the injected power variations on an electrical network are currently controlled between the various centralized electric power generation sites.

Although this is not described herein, it should be understood that the shedding operations are used to avoid a supply of expensive additional power by the generators. When the maximum possible shedding is approached, it becomes necessary to use additional power.

Figure 2:
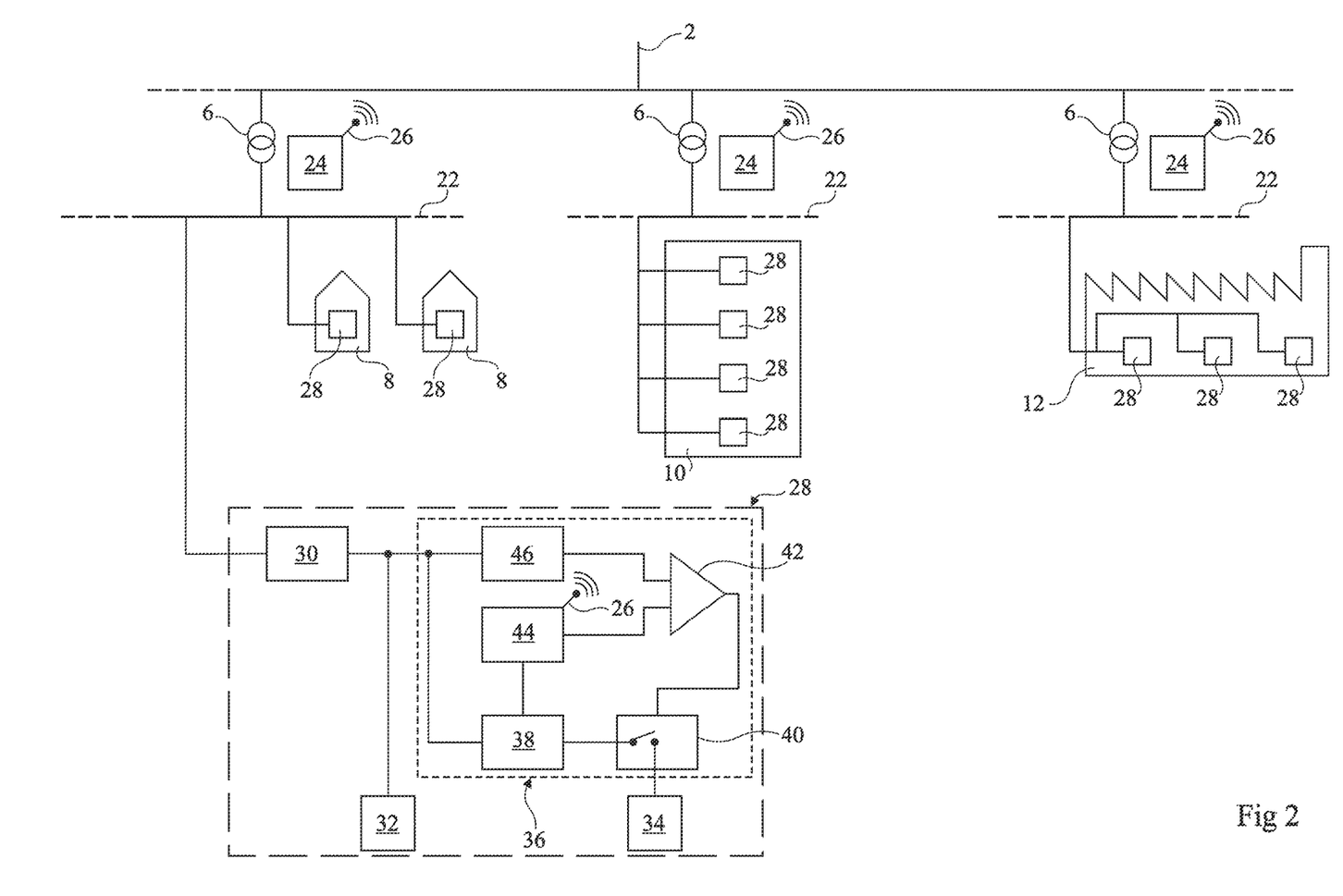

FIG. 2 schematically shows an example of an electric network adapted to a linear stabilization by load shedding.

An electrical distribution network 2 powers user sub-networks 22 via transformers 6. Each sub-network 22 is associated with a sub-network manager 24, for example, a data concentrator, comprising communication means 26. One sub-network manager per sub-network or centralized sub-network managers may be provided. In this last case, each centralized sub-network manager may independently manage a plurality of sub-networks. Sub-networks 22 power electric power consumer sites 28, for example, at the level of houses 8, apartment blocks 10, or factories 12.

Only one site 28 is shown in detail, at the bottom left of FIG. 2. This site comprises a main meter 30, non-sheddable loads 32, sheddable loads 34, and a sheddable load controller 36. Main meter 30 is connected to a sub-network 22 and is connected on the one hand to sheddable loads 34 via a sheddable load controller 36 and, on the other hand, to non-sheddable loads 32. Sheddable loads 34 are, for example, electric radiators, electric water heaters, air-conditioning systems, or other electric loads, which do not affect the consumer's well-being when interrupted.

Sheddable load controller 36 comprises:
- a secondary meter 38 connected to main meter 30 and connected to sheddable loads 34 via a switch 40,
- a frequency comparator 42 having its output connected to a control input of switch 40 and having its two inputs respectively connected to a control unit 44 and to a frequency meter 46, the frequency meter being connected to sub-network 22, for example, via main meter 30, and
- communication means 26 connected to control unit 44, the control unit being itself connected to secondary meter 38.

Main meter 30 measures the power consumed by all the loads 32 and 34 of site 28. Secondary meter 38 measures the instantaneous power capable of being cut back, that is, the power effectively consumed by sheddable loads 34 only. This measurement is transmitted to control unit 44 which sends it to the corresponding sub-network manager 24 via communication means 26. The manager deduces from this measurement an estimated power capable of being cut back for a time interval which follows this measurement, for example fifteen minutes. The estimated power capable of being cut back of each consumer site may be determined, for example, from the instantaneous power capable of being cut back and while taking into account a history of the power consumption of the sheddable loads of the site and/or of the variation rate of the instantaneous power capable of being cut back of the site. The estimated power variation rate may also be estimated at the level of each site.

At the level of each sub-network manager 24, a threshold frequency is calculated for each site associated with sub-network manager 24 and is sent to control unit 44 of this site.

Comparator 42 of the site compares the threshold frequency received by control unit 44 at the operating frequency of the network measured by frequency meter 46. If the measured frequency falls below the threshold frequency, comparator 42 controls the turning off of switch 40, that is, the disconnection of sheddable loads 34.

To limit as much as possible power jolts on the electrical network and to stabilize the response of the electrical network after, for example, a large-scale incident, each threshold frequency is calculated to ensure a regularly stepped variation of the cutback power according to the network frequency, for example, as described hereafter.

Figure 3:
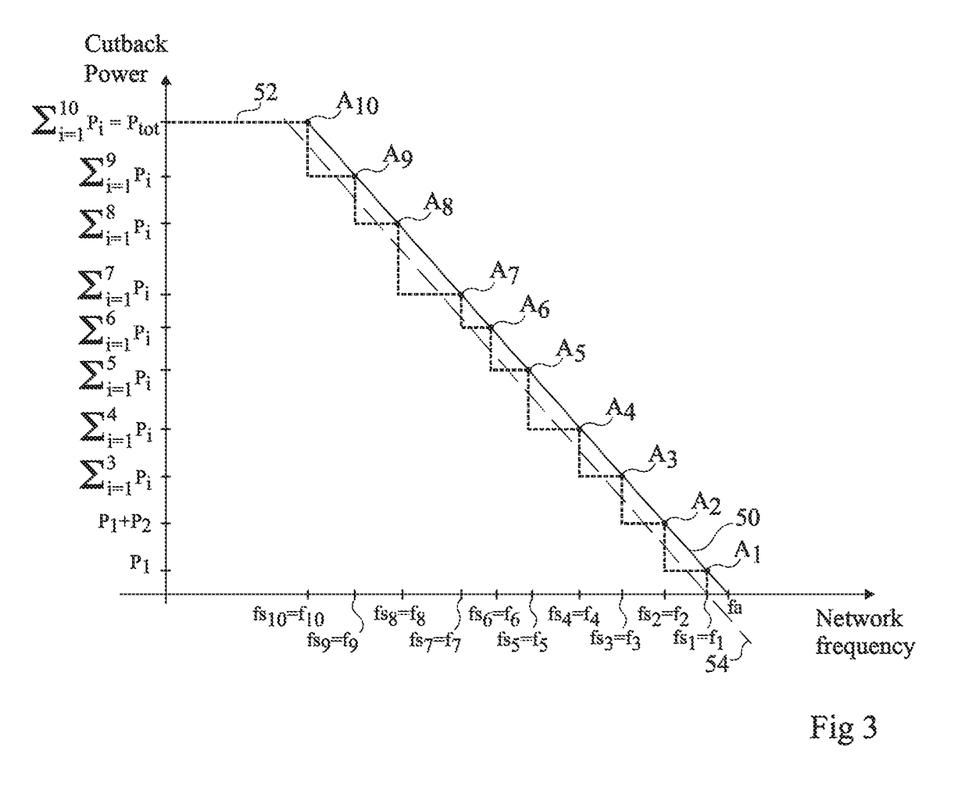
FIGS. 3 and 4 illustrate examples of variation of the cutback power according to the network frequency. For clarity, the same elements have been designated with the same reference numerals in the different drawings.

FIG. 3 illustrates a first example of the variation of the cutback power on a sub-network according to the network frequency.

A sub-network 22 such as described in FIG. 2 comprising ten sites 28 numbered from 1 to 10 is considered as an example. Load sheddings are desired to be performed as soon as the network frequency falls below a high value, fa (for example, 49,800 Hz for a 50-Hz network), and so that all possible sheddings are performed when the network frequency reaches a low value, fb (for example, 49,500 Hz for a 50-Hz network).

The site numbered 1 will be shed first, followed by the site numbered 2, and so on until the site numbered 10.

At the level of each site 28, numbered j, the instantaneous power capable of being cut back of sheddable loads 34 is measured and the measured value is sent to sub-network manager 24. Sub-network manager calculates, in particular, the estimated power capable of being cut back $P_j$, of each site number j and the maximum power $P_{tot}$ capable of being cut back from the sub-network and which is the sum of the estimated powers capable of being cut back of all the sub-network sites 28.

To have as linear a cutback power variation as possible in interval [fb,fa], the curve of variation of the power cut back from the sub-network according to the network frequency is desired to come as close as possible to a straight line 50 having a slope equal to $P_{tot}/(fb-fa)$.

Sub-network manager 24 first calculates frequency $f_1$ of point $A_1$ of ordinate $P_1$ of lines 50. After this, sub-network manager 24 calculates frequency $f_2$ of point $A_2$ of ordinate $P_1+P_2$ of line 50. More generally, the sub-network manager calculates frequencies $f_j$ of points $A_j$ of ordinates $$\sum_{i=1}^{j} P_i$$

of straight line 50.

Sub-network manager 24 sends to each of sites 28 number j a threshold frequency $fs_j$ equal to previously-calculated frequency $f_j$. Thus, each site j sheds its sheddable loads 34 when the network frequency reaches value $fs_j$. The shedding is preferably instantaneous to avoid the use of methods of RoCoF ("Rate of Change of Frequency") type, such as used in above-mentioned U.S. Pat. No. 6,314,378.

Curve 52 shows the real variation of the power cut back from the sub-network according to the network frequency. Curve 52 may be approximated by a straight line 54 very close to line 50. There thus is a quasi-linear variation of the cutback power according to the network frequency.

Figure 4:
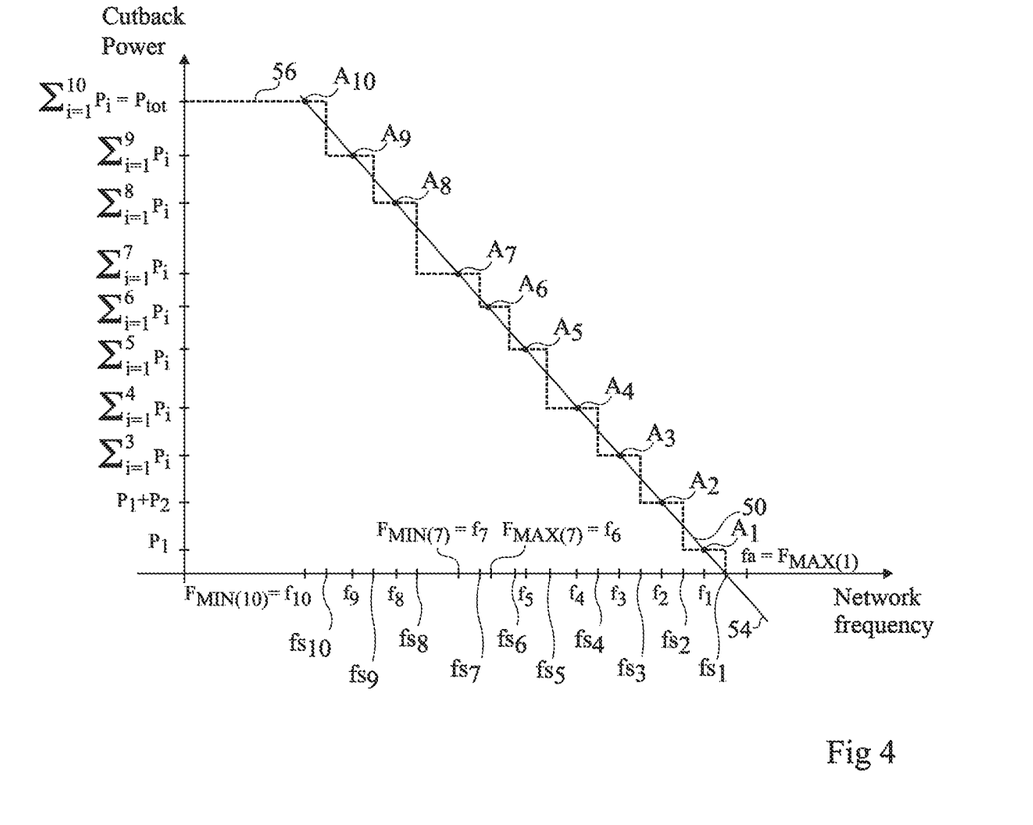

FIG. 4 illustrates a second example of the variation of the power cut back from a sub-network according to the network frequency.

As an example, the sub-network considered herein is the same as that described in relation with FIG. 3, that is, it is associated with the same ten sites 28 numbered in the same order. For each site numbered j, the estimated power $P_j$ capable of being cut back is the same as in FIG. 3. The curve of the power cut back from the sub-network according to the network frequency is desired to come as close as possible to straight line 50 of slope $P_{tot}/(fb-fa)$.

As previously described in relation with FIG. 3, sub-network manager 24 calculates $f_1$ to $f_{10}$.

Manager 24 then associates with each site j a frequency interval $[F_{min(j)}, F_{max(j)}]$ such that for each site j between 1 and 10:

$F_{min(j)}=f_j$,
$F_{max(j)}=F_{min}(j-1)$, if j≥2 and
$F_{max(1)}=fa$.

For each site j, sub-network manager 24 selects a threshold frequency $fs_j$ in the middle of interval $[F_{min(j)}, F_{max(j)}]$.

Sub-network manager 24 sends to each of the sites 28 number j the calculated threshold frequency $fs_j$. Thus, each site j sheds sheddable loads 34 at frequency $fs_j$.

Curve 56 shows the real variation of the power cut back from the sub-network according to the network frequency. Curve 56 may be approximated by a straight line confounded with line 50. There thus is a quasi-linear variation of the cutback power according to the network frequency.

Two ways of calculating threshold frequencies have been described in relation with FIGS. 3 and 4. More generally, the threshold frequency $fs_j$ of each site j may be selected in a frequency interval $[F_{min(j)}, F_{max(j)}]$. The values of $F_{min(j)}$ and $F_{max(j)}$ may be calculated by the sub-network manager based on the following formulas:

$$F_{max(j)} = fa + (fb - fa) \times \left( \sum_{i=1}^{j-1} P_i \Big/ \sum_{i=1}^{N} P_i \right) \quad (1)$$

$$F_{min(j)} = fa + (fb - fa) \times \left( \sum_{i=1}^{j} P_i \Big/ \sum_{i=1}^{N} P_i \right) \quad (2)$$

In formula (1), the sum of the estimated powers $P_i$ capable of being cut back for i in the range from 1 to j−1 is considered as zero when j=1.

Specific embodiments have been described. Various alterations, modifications, and improvements will readily occur to those skilled in the art.

The order in which the N sites 28 shed their sheddable loads may be modified by sub-network manager 24, for example, to avoid putting at disadvantage a site where the shedding would always occur first, or to favor the shedding from one site rather than another. Thus, this order may be randomly selected and periodically revised, for example, every week, to obtain a non-discrimination of the loads taking part in the shedding.

To calculate the estimated power $P_j$ capable of being cut back for each consumer site j, the instantaneous power capable of being cut back at the level of each site may be measured periodically or following a request originating, for example, from sub-network manager 24.

At the sub-network manager level, the calculation of the threshold frequencies is performed a plurality of times over time to take into account changes of instantaneous powers capable of being cut back consumed by the sheddable loads of the sub-network and to take into account, for example, a new reference interval [fb,fa] or parameters such as for example the time and/or the data at which the threshold frequencies are calculated. As an example, the threshold frequencies of a sub-network are calculated at regular time intervals or after a request, for example, from a site 28 having an estimated power capable of being cut back which has greatly changed. It may also be provided to calculate threshold frequencies in a different frequency interval for each sub-network so that the union of these intervals corresponds to the interval [fa,fb] over which the electrical network is desired to be frequency-stabilized.

Thus, the threshold frequencies are adapted in real time to the real state of the power consumption capable of being cut back from the network, the threshold frequencies being recalculated to follow the variation of the power capable of being cut back which is really consumed. This allows load sheddings, at the level of each sub-network, causing as linear a variation as possible of the cutback power according to the network frequency. By superposing the linear variations of each sub-network, a variation, also linear, of the cutback power according to frequency is obtained at the network level.

As an example, sub-network manager 24 as well as sheddable load controller 36 may comprise one or a plurality of processors and one or a plurality of computer-readable non-transient storage supports. The embodiments described hereabove in relation with FIGS. 2 to 4 may be implemented in several ways, for example, by means of a dedicated circuit, of software, or of a combination thereof. When they are implemented by software, the software code may be executed on any suitable processor (for example, a microprocessor) or a set of processors, be they provided in a single computing device or distributed between a plurality of computing devices.

Communication means 26 may be wired, wireless, or by carrier current over the lines of a sub-network. The communication means for example implement a point-to-point or multipoint communication.

Comparators 42 are also provided to control the reconnection of the sheddable loads when the network frequency rises above a threshold reconnection frequency which may be different from the threshold disconnection frequency. Each comparator 42 may be a hysteresis comparator to avoid for switch 40 to oscillate between the off state and the on state when the network frequency is close to the threshold frequency.

Although a sheddable load controller 36 shedding all its sheddable loads at a threshold frequency has been described at the level of each consumer site, a plurality of sheddable load meters, each of which is associated with a different threshold frequency, may be provided at the level of each site. In this case, sheddable load controller 36 maybe capable of communicating with communicating sheddable loads. The communicating sheddable loads comprise their own network disconnection means and, when the network frequency falls below a threshold frequency, the communicating sheddable loads associated with this threshold frequency disconnect from the network.

According to an advantage, the fact of using a plurality of sub-network managers 24, each associated with a sub-network rather than a single manager for the entire network results in simpler practical implementations and in the calculation of the thresholds, by each sub-network manager, of a limited number of consumer sites.

Embodiments of a method of stabilizing an electric network by shedding of loads when the network frequency drops have been described herein. This method may also be used to check a frequency increase due to an excess power generation as compared with the power consumption. The problem more particularly arises in the case where distributed generators, for example, wind power generators or solar panels, are connected to sub-networks. It may be provided to disconnect these generators successively or in successive groups so that the variation of power removed from the network is quasi-linear as compared with the network frequency variation.

Embodiments of a method of frequency stabilization of an electrical network when the network frequency varies from a high frequency $f_a$ to a low frequency $f_b$ where, for each sub-network powered by the electrical network, a threshold frequency is calculated for each of the N consumer sites of the sub-network, has been described in relation with FIGS. 3 and 4. In each site, sheddable loads are disconnected when the corresponding threshold frequency is reached. Thus, when the network frequency reaches frequency $f_b$, the N sites of a sub-network have disconnected their sheddable loads.

As a variation, the inventors provide only calculating threshold frequencies for some of the sub-network sites. In a sub-network 22 comprising, as an example, N=15 consumer sites, the case wherein, when the network frequency varies from $f_a$ to $f_b$, the cutback power variation on the sub-network according to the network frequency is desired to come as close as possible to a slope of predetermined slope A is considered as an example. Slope A is for example a reference provided to the sub-network manager by a manager of the electrical network, for example, by TEN in the case of a sub-network located in France.

As previously described in relation with FIGS. 3 and 4, the manager has numbered the N consumer sites from 1 to 15 and, for each site j, has calculated an estimated power $P_j$ capable of being cut back based on the measurement of the instantaneous power capable of being cut back consumed by the sheddable loads of this site.

The sub-network manager then calculates the power P to be cut back from the sub-network so that $P=(f_b-f_a)*A$. In practice, power P to be cut back is lower than the maximum power $$P_{tot} = \sum_{i=1}^{N} P_i$$

which may be cut back from the sub-network. The sub-network manager selects a number M, for example, 10, of sites such that the sum of the estimated powers capable of being cut back at these M sites is equal to the power P to be cut back, in other words, such that $$P = \sum_{i=1}^{M} P_i.$$

At this step, the sub-network manager may have to number again the sites in a different order so that the M selected sites are numbered from 1 to M. The sub-network manager then calculates a threshold frequency $fs_j$ for each of the M consumer sites as described in relation with FIGS. 3 and 4 and by using formulas (1) and (2) where N is replaced with M.

It can thus be understood that the consumer sites numbered from M+1 to N form a reserve of power capable of being cut back from the sub-network.

Thus, in the case where the instantaneous power capable of being cut back of one of the consumer sites numbered from 1 to M deviates, for example, by more than 10%, from the estimated power capable of being cut back of this site, the sub-network manager starts calculating again the threshold frequencies by using one or a plurality of the sites numbered from M+1 to N to guarantee the value of power P to be cut back, and thus guarantee slope A. Preferably, if the manager recalculates the threshold frequencies while certain sites have already disconnected their sheddable loads, the order number of these sites is not modified. As a first example, in the case where M=10 and where the consumer site numbered 5 has an instantaneous power capable of being cut back which increases by more than 10% with respect to its estimated power $P_5$ capable of being cut back, if the reserve site numbered 13 has an estimated power $P_{13}$ capable of being cut back substantially equal to the initial value of $P_5$, the sub-network manager may exchange the order number of the two sites. As a second example, in the case where M=10, if consumer site 5 has an instantaneous power capable of being cut back which decreases by a quantity corresponding to more than 10% of its estimated power $P_5$ capable of being cut back and if one of the reserve sites, for example, site 14, has its estimated power $P_{14}$ capable of being cut back substantially equal to this quantity, the sub-network manager may assign threshold frequency $fs_5$ to site 14 as well as to site 5. Thus, when the network frequency falls below threshold frequency $fs_5$, sites 5 and 14 disconnect their sheddable loads, causing a power variation substantially equal to the initial value of $P_5$.

In each sub-network, the use of reserve consumer sites to guarantee the value of power P to be cut back, and thus slope A, results in that the variation of the power cut back from the electrical network according to the network frequency comes as close as possible to a straight line of predetermined slope A.

A method of disconnecting the sheddable loads of a sub-network such that the variation of power cut back from this sub-network according to the network frequency follows a predetermined curve in the case where the curve is a straight line has been described. The cutback power variation may also be provided to follow a curve other than a straight line, for example, a curve having a small slope when the network frequency is close to a nominal frequency, for example, fa, and having a stronger slope when the network frequency deviates from this nominal frequency, for example, when it comes closer to fb.

The invention claimed is:

1. A method of stabilizing, between a high frequency, fa, and a low frequency, fb, an electrical network powering a plurality of sub-networks, each sub-network being associated with a sub-network manager and powering a plurality, N, of consumer sites, each site, j, comprising non-sheddable loads and sheddable loads, the method comprising, for each sub-network, the steps of:
   ensuring a remote communication between each site and its sub-network manager;
   periodically measuring at the level of each site the value of the instantaneous power capable of being cut back consumed by the sheddable loads of the site;
   deducing for each site an estimated power capable of being cut back, $P_j$, for an upcoming period;
   setting an order 1 to N in which the N sites disconnect their sheddable loads; and
   sending to each site j a threshold frequency, $fs_j$, such that sheddable loads of this site are disconnected when the network frequency falls below threshold frequency $fs_j$,
   wherein the sub-network manager calculates the threshold frequencies based on the estimated powers capable of being cut back so that the variation of the cutback powers according to frequency is as linear as possible.

2. The method of claim 1, comprising the steps of:
   calculating and associating with each site, j, a frequency interval $[F_{min(j)}, F_{max(j)}]$, by applying the following formulas:

$$F_{max(j)} = fa + (fb - fa) \times \left( \sum_{i=1}^{j} P_i \bigg/ \sum_{i=1}^{N} P_i \right)$$

$$F_{min(j)} = fa + (fb - fa) \times \left( \sum_{i=1}^{j} P_i \bigg/ \sum_{i=1}^{N} P_i \right)$$

where $P_i$ is the estimated power capable of being cut back from the site of index i; and selecting threshold frequencies $fs_j$ within interval $[F_{min(j)}, F_{max(j)}]$.

3. The method of claim 2, wherein the threshold frequency $fs_j$ of each site j is selected in the middle of interval $[F_{min(j)}, F_{max(j)}]$.

4. The method of claim 1, wherein the estimated power, $P_j$, capable of being cut back of a site j is deduced from the value of the instantaneous power capable of being cut back of this site and from a power consumption history of the sheddable loads of this site.

5. The method of claim 1, wherein the order 1 to N in which the N sites disconnect their sheddable loads is periodically modified.

6. The method of claim 1, wherein the instantaneous power capable of being cut back consumed by the sheddable loads of a site is measured after a request from the sub-network manager.

7. The method of claim 1, wherein the sheddable loads of a site j are connected back once the network frequency has risen back above the threshold frequency $fs_j$ of this site.

8. The method of claim 1, wherein the sub-network further comprises second sites comprising sheddable generators, the method comprising sending to each second site a threshold frequency such that the sheddable generators are disconnected when the network frequency rises above the threshold frequency of the site.

9. A system for stabilizing an electrical network powering a plurality of sub-networks, each sub-network powering a plurality, N, of consumer sites, each site, j, comprising non-sheddable loads and sheddable loads, the system comprising:
   at the level of each site, at least one meter for periodically measuring the value of the instantaneous power capable of being cut back consumed by the sheddable loads of the site and, associated with each of said at least one meter, a switch for disconnecting the sheddable loads of the site when the network frequency falls below a threshold frequency $fs_j$;
   a sub-network manager associated with each sub-network comprising means for calculating threshold frequencies so that the variation of the cutback powers according to frequency is as linear as possible;
   means of remote communication between each sub-network manager and the associated sites; and
   at the level of each site or at the manager level, means for determining over a period an estimated power, $P_j$, capable of being cut back, the threshold frequencies being calculated based on the estimated powers capable of being cut back.

* * * * *